United States Patent [19]

Hart

[11] 4,285,033
[45] Aug. 18, 1981

[54] LAMPHOLDER—SWITCH MODULE

[75] Inventor: James A. Hart, Marshall, Mich.

[73] Assignee: Progressive Dynamics, Inc., Marshall, Mich.

[21] Appl. No.: 60,666

[22] Filed: Jul. 25, 1979

[51] Int. Cl.³ .............................................. F21V 23/00
[52] U.S. Cl. .................................. 362/295; 362/147; 362/362; 362/368; 362/406
[58] Field of Search ............... 362/147, 295, 362, 368, 362/406

[56] References Cited

U.S. PATENT DOCUMENTS 4,157,585  6/1979  Freeman .............................. 362/368

Primary Examiner—Stephen J. Lechert, Jr.
Attorney, Agent, or Firm—Beaman & Beaman

[57] ABSTRACT

The invention pertains to a lampholder and switch module which may be readily installed in a lamp fixture, and is particularly suitable for automotive and recreational vehicle use. A housing includes a lamp socket having electrical contacts located therein, and a switch slidably mounted upon the housing employs cam structure for translating a contact between lamp base engaging and disengaging positions to selectively complete and break the circuit to the lamp. The module is characterized by its economics of fabrication, assembly, and installation.

10 Claims, 11 Drawing Figures

LAMPHOLDER—SWITCH MODULE

BACKGROUND OF THE INVENTION

Light fixtures for vehicle and recreational vehicle use commonly employ a base or casing upon which lens structure is removably mounted. An electric lamp, usually an incandescent bulb, is mounted upon the casing adjacent the lens, and switch structure is affixed to the casing to permit manual energizing of the lamp. Usually, the lamp socket is of conventional form comprising a metal cylindrical element having contacts associated therewith, and the switch is usually general purpose in nature, of low cost, and is wired to the socket and electrical supply by soldering and insulated conductors. In the manufacture of such light fixtures the lamp socket is soldered, screwed or riveted to the fixture base or casing; the switch is affixed to the casing by threaded fasteners, or riveting; and these two components are wired together, and conductors extending from the switch are connected to the electric power source. As will be appreciated, even in a light fixture of relatively simple configuration detailed assembly and fabrication techniques are required to assemble the fixture casing, lamp socket and switch.

It is known to combine lampholder and switch apparatus, and U.S. Pat. Nos. 1,710,264 and 1,761,438 show such combined structure wherein conductors have been eliminated and the number of components reduced. Likewise, it is known to utilize displaceable contacts actuated by manually translated handles and the like to engage and disengage lamp bases for making and breaking the lamp circuit, and such arrangements are known in the flashlight and related arts such as shown in U.S. Pat. Nos. 2,646,477; 2,762,907; 2,937,266 and 3,076,891.

However, low cost combined lampholder and switch modules for use with vehicle interior lights have not previously been available which meet the requirements of such fixtures, and are capable of providing service over extended periods of time without maintenance, and the invention is directed to lampholder and switch structure of an integral nature which overcomes many of the shortcomings of available light fixture apparatus.

SUMMARY OF THE INVENTION

It is an object of the invention to provide a combination lamp base and switch module for use with vehicle light fixtures, and the like, wherein a common housing defines the lamp receiving socket and incorporates the switch structure.

A further object of the invention is to provide a combination lampholder and switch module which may be very quickly installed into a vehicle light fixture without special equipment and in a positive manner preventing disassembly due to vibration or age.

An additional object of the invention is to provide a combination lampholder and switch module of dialectric material which may be economically molded, utilizes inexpensive lamp base contacts, and the switch components are actuated with a sliding movement wherein a contact is displaced by a switch member to produce a wiping action of the contact upon the lamp base minimizing the likelihood of an incompleted circuit due to foreign matter upon the contact.

In the practice of the invention the light fixture includes a dished base or pan to which a transluscent lens may be affixed by a snap-on action. The combination lampholder and switch module is mounted upon the base by cantilever supported fingers extending from the module casing, such fingers being received within base openings so dimensioned that the fingers are resiliently deformed from their normal dimensional relationship and abutment surfaces defined upon the fingers engage the base to maintain the module upon the base in a positive manner.

The module casing consists of two molded portions of dialectric material which, when bonded together, defined a cylindrical socket for receiving an incandescent lamp base, and a fixed metal contact is located within the socket coaxial therewith for engaging the lamp base center terminal. The module casing also includes a formed metal leaf spring contact having an end adapted to selectively engage the side wall of the lamp base, and a slidable switch cam incorporated into the module selectively deforms the movable contact for engagement with the lamp base with a sliding or rubbing action. The switch cam engages contact structure which maintains the movable contact either in an off or on condition. The switch structure includes a handle portion extending from the modular casing, and extends through an opening defined in the lamp base for ready access by the vehicle occupant.

BRIEF DESCRIPTION OF THE DRAWINGS

The aforementioned objects and advantages of the invention will be appreciated from the following description and accompanying drawings wherein.

DESCRIPTION OF THE PREFERRED EMBODIMENT

Figure 1:
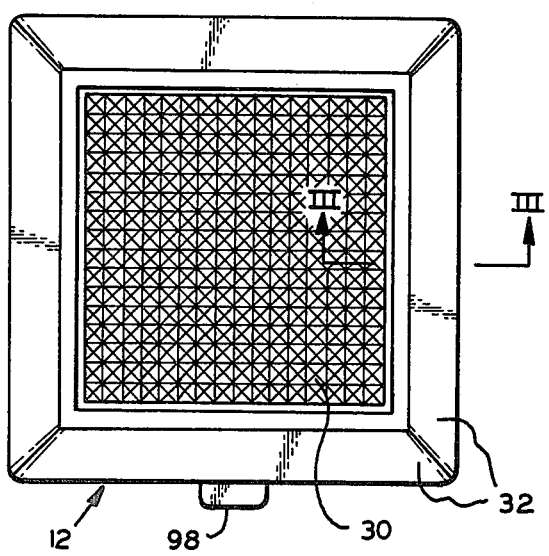
FIG. 1 is a plan view of a light fixture utilizing the module of the invention, illustrating a typical lens configuration.

The light fixture with which the combination lampholder and switch module of the invention is employed is best illustrated in FIGS. 1-4, and, basically, such fixture includes a base pan 10 formed of sheet metal to which a translucent synthetic plastic lens 12 is affixed.

The base pan 10 includes a relatively flat surface 14 having four indentations and holes 16 by which the base may be affixed to a ceiling or wall by screws. The base pan includes sidewalls 18 which terminate in an outwardly extending peripheral flange 20 defining four linear edges. The base pan includes an indentation 22 in which elongated slots 24 are formed, and the triangular portion 26 is of such configuration as to accommodate a cylindrical portion of the lampholder and switch module. The wall 18 adjacent the portion 22 is provided with a rectangular opening 28 through which the module switch handle extends, as later described.

The lens 12 may be molded of a single homogeneous portion of translucent synthetic plastic, and includes a base portion upon which a prismatic pattern 30 is defined. The walls 32 of the lens are inclined relative to each other in an oblique manner, and the walls terminate in edges upon which inwardly extending ledges 34 are formed. The dimension of the lens is such that the walls 32 may be forced over the base flanges 20 temporarily deforming the walls whereby the ledges 34 may be located "below" the flanges to affix the lens upon the base in a "snap-on" manner. The lens may be removed from the base by grasping and distorting the walls 32 and pulling the same away from the base pan.

Figure 9:
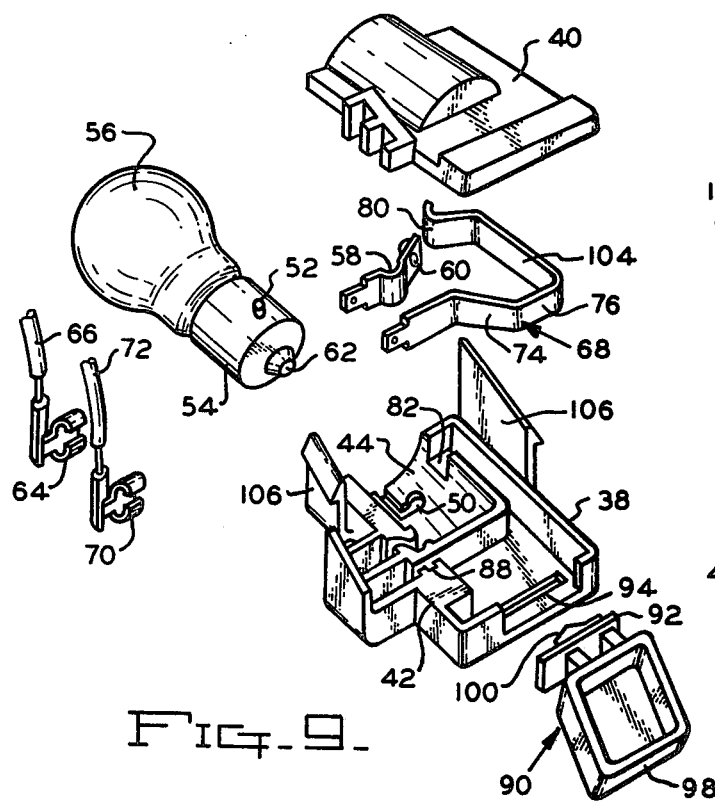
FIG. 9 is an exploded, perspective view of the components constituting the combination lampholder and switch module.

The combination lampholder and switch module includes a casing 36 consisting of two portions, 38 and 40, molded of a dielectric synthetic plastic material. These parts include a planar parting line 42, and are assembled by suitable adhesives or solvents. The portion 38 includes semi-cylindrical bulb socket surface 44, and the portion 40 includes a similar semi-cylindrical bulb socket surface 46 wherein assembly of the parts defines a cylindrical bulb socket 48, and bayonet type recesses 50 are defined therein for cooperating with the bayonet projections 52 defined upon the lamp base 54 of incandescent lamp bulb 56, FIG. 9.

The part 38 is shaped to support a metal fixed contact 58 having a bulbous end impression 60 which is alignment with the axis of the socket 48 for contact with the bulb center contact 62. The other end of the contact 58 is shaped to receive a push-on conductor terminal 64 mounted on conducting wire 66.

The other electrical contact 68 within casing 36 is in the form of an elongated metal element having an end receiving push-on conductor terminal 70 connected to wire conductor 72, and the contact further includes an inclined portion 74 intersecting linear portion 76 at 78. The contact 68 terminates in a free end which is curved back in an arcuate manner to form a convex surface 80 disposed adjacent an opening 82 defined in the socket surface 44 and rests upon inclined surface 84. The normal shape, configuration and dimension of the contact 68 is such that when the contact is properly located within the casing part 38, as aided by the reception of the contact dimple 86 in casing part groove 88, the contact surface 80 will be engaging the oblique surface 84, and the surface 80 will be retracted from the socket 48.

Operation of the contact 68 is produced by a switch 90 which includes a carriage 92 slidably received within elongated grooves 94 and 96 defined in the casing parts 38 and 40, respectively. The carriage 92 is of a rectangular configuration and is capable of moving within the grooves between the positions shown in FIGS. 10 and 11.

Figure 2:
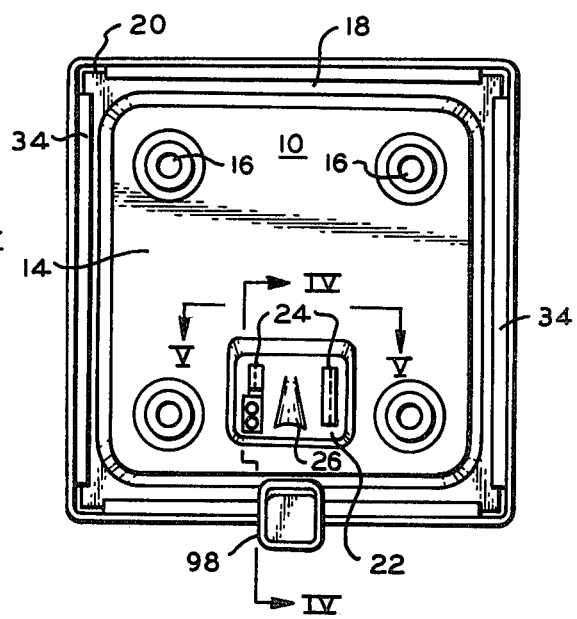
FIG. 2 is a plan view of the light fixture of FIG. 1, illustrating the opposite side thereof, showing the base configuration.
Figure 3:
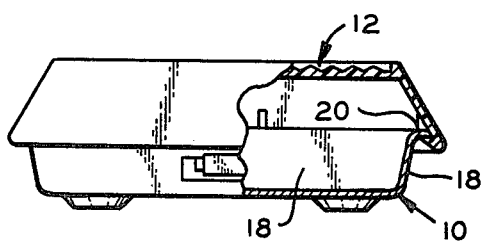
FIG. 3 is an elevational view of the lamp fixture, partially sectioned, as taken along Section III—III of FIG. 1.
Figure 4:
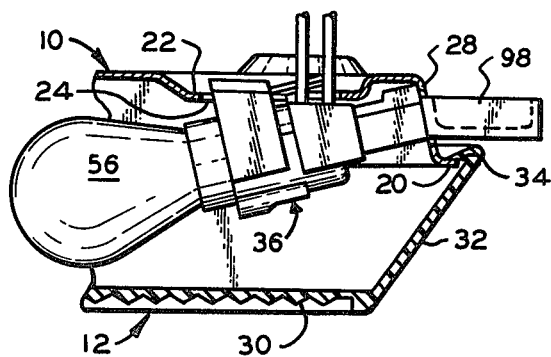
FIG. 4 is an enlarged, elevational, detail sectional view illustrating the combination lampholder and switch module as taken along Section IV—IV of FIG. 2.
Figure 6:
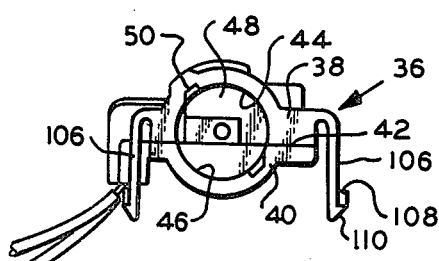
FIG. 6 is an elevational view of the combination lampholder and switch module, per se, as taken in a direction toward the bulb socket.
Figure 7:
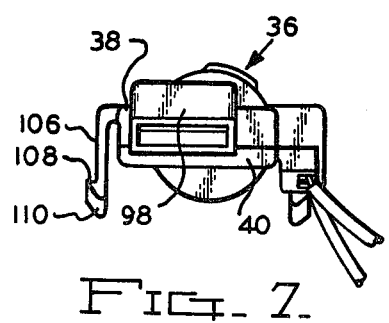
FIG. 7 is an end view of the module, per se, as taken from the opposite end of FIG. 6.

The carriage 92 is translated by a handle 98 extending through the handle opening 28 defined in the pan wall 18, and as will be appreciated from FIGS. 1 and 2, the dimension of handle 98 is sufficient to extend beyond the projection of the lens 12 for ready access by the user.

Figure 10:
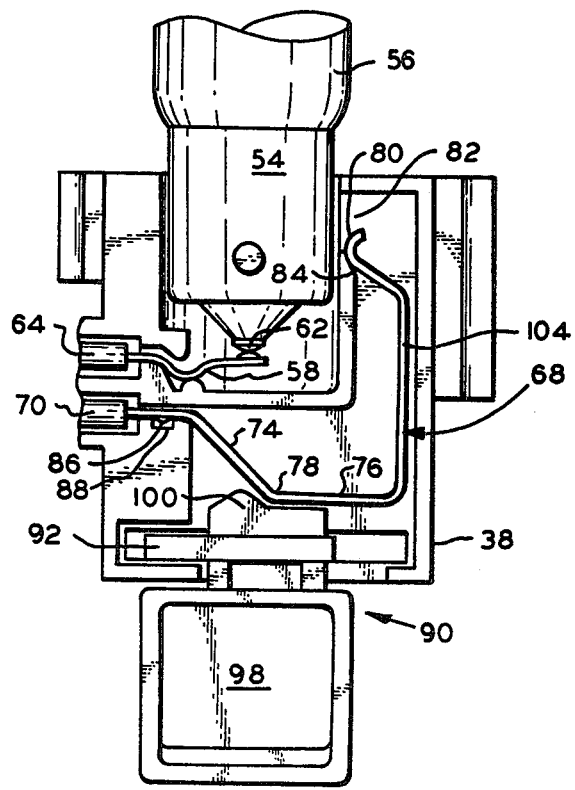
FIG. 10 is an enlarged, detail, sectional view of the module illustrating the contacts in an open circuit condition, and, FIG. 11 is a view similar to FIG. 10, illustrating the components in a closed circuit condition.
Figure 11:
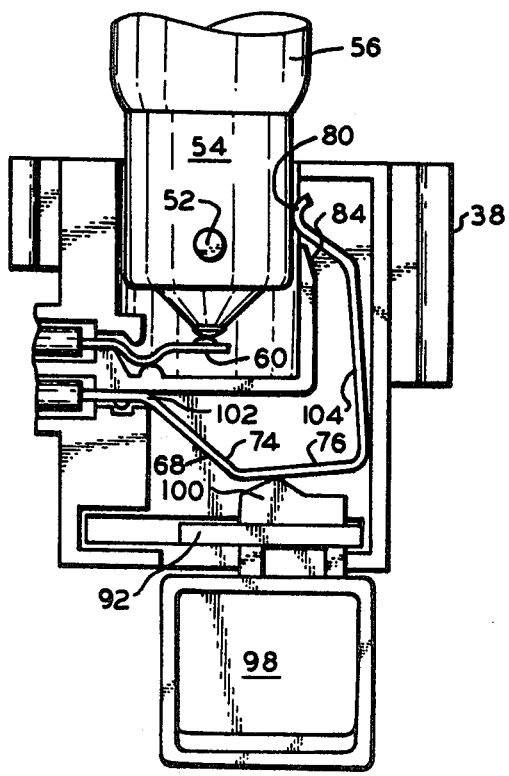

Inwardly, the carriage 92 includes a cam 100 having a configuration which will be apparent from FIGS. 10 and 11. Thus, when the carriage is in the "off" position shown in FIG. 10 the cam 100 will be disposed to the left of the intersection 78 of contact 68 and in this position the cam exerts no influence on the contact 68 which assumes its normal and unstressed condition shown in FIG. 10 wherein the convex surface 80 is retracted from the socket 48.

When it is desired to energize the lamp 56 the carriage 92 is shifted to the right, FIG. 11, such that the cam 100 engages the contact intersection 78 and moves onto the contact portion 76. Such engagement with the portion 76 causes a pivoting about the contact location 102 forcing the contact portion 104 upwardly, and the convex surface 80 moves inwardly through the opening 82 into socket 48 for direct engagement with the lamp base 54. As the cam 100 is moving across the portions 74 and 76 over intersection 78 the surface 80 will move in an upward direction, as viewed in FIGS. 10 and 11, along the lamp base 54 producing a wiping action which will "clean" the contact surface and the engaging base surface each time the switch is actuated. The movement of the carriage 92 to the right, FIG. 11, past intersection 78 produces an "overcenter" movement retaining the carriage in the position of FIG. 11 until manually shifted to the off position of FIG. 10.

Figure 5:
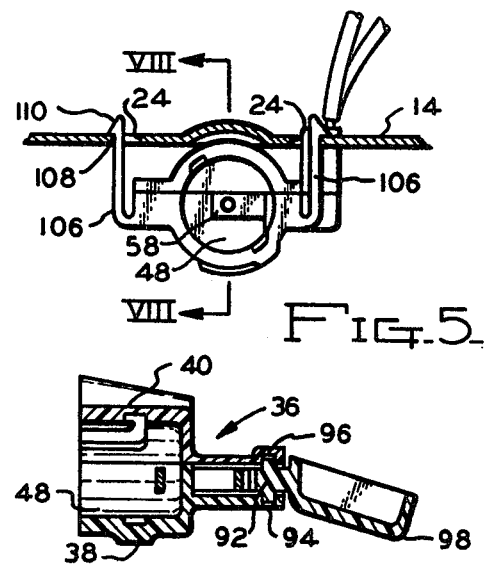
FIG. 5 is a detail elevational view as taken along Section V—V of FIG. 2, the lamp being removed.
Figure 8:
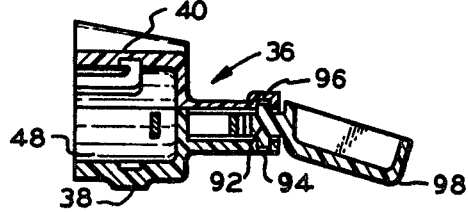
FIG. 8 is a sectional view as taken long Section VIII—VIII of FIG. 5.

The casing portion 38 includes a pair of cantilever supported fingers 106 extending in a common direction from the portion 38, and each of the fingers terminates in a "barbed" end defining an abutment ledge or surface 108. The normal dimension between the fingers 106 in slightly greater than the dimension of the outermost surfaces of the base pan slots 24 wherein insertion of the fingers into the slots 24 producing engagement of the finger's inclined surfaces 110 will deform the fingers inwardly, and as soon as the ledge surfaces 108 align with the "outer" edge of the surface 14 the fingers 106 will snap outwardly to overlap the slot edges as apparent in FIGS. 2 and 5. In this manner the lampholder and switch module is very quickly assembled to the base pan 10, but is assembled in such a manner as cannot be readily removed without manually deflecting the fingers toward each other, and vibration will not produce inadvertent release of the module from the base pan.

It will be appreciated that the apparatus of the invention requires only the connection of the conductors 66 and 72 to the vehicle electrical system, and due to the integral construction of the bulb holder and switch components the electrical conducting elements required with the invention are minimized. The molded fabrication of the module body parts assures low cost manufacture, as does the simple and inexpensive construction of the contacts 58 and 68, and the switch components, and the mode of assembly permits the portions 38 and 40 to only be assembled if the parts are properly located prior to joining of these portions.

It is appreciated that various modifications to the inventive concepts may be apparent to those skilled in the art without departing from the spirit and scope of the invention.

I claim:

1. A lamp assembly comprising, in combination, a base having a supporting surface, a pair of lampholder receiving openings defined in said base spaced from each other, a combination lampholder and switch assembly mounted on said base, said lampholder and switch assembly including a pair of resilient cantilever fingers each having a free end, an abutment surface defined on each finger free end, the normal spacing between said fingers' free ends slightly differing from the spacing between said openings whereby upon deflection of said fingers said free ends thereof may be received within said openings and said abutment surfaces engage said base preventing withdrawal of said fingers from said openings wherein said lampholder and switch assembly is mounted on said base with a snap-in movement.

2. In a lamp assembly as in claim 1 wherein the spacing between said openings is less than the normal spacing between said fingers' free ends whereby said fingers' free ends must be deflected toward each other to permit insertion into said openings.

3. In a lamp assembly as in claim 2 wherein said free ends each include an outer surface and said abutment surfaces comprise barbs defined on said fingers' free ends adjacent said outer surfaces.

4. In a lamp assembly as in claim 1, said base including a pan having a periphery, wall portions extending from said pan periphery, said base openings being defined in said pan, an opening defined in said wall portion adjacent said openings, and a switch handle defined on said bulb holder and switch assembly extending through said wall portion opening.

5. An integral lampholder and switch assembly comprising, in combination, a casing, mounting means defined on said casing, a lamp base receiving socket defined in said casing, electric contacts mounted on said casing extending into said socket for contacting a lamp base inserted into said socket, switch means operatively associated with said contacts and movable mounted within said casing between conducting and nonconducting positions, said switch means including a handle extending from said casing accessible for manually translating said switch means between said positions.

6. In an integral lampholder and switch assembly as in claim 4, said casing being molded of a dielectric material.

7. In an integral lampholder and switch assembly as in claim 5, said socket being of substantially cylindrical configuration having a sidewall, an axis, and a closed end, a first contact located adjacent said closed end in substantial alignment with said axis, a contact opening defined in said sidewall, a second contact movably mounted within said casing having a lamp base engagable portion selectively extending through said contact opening into said socket and retracting from said socket through said contact opening, said switch means engaging said second contact and extending said second contact at said conducting position and retracting said second contact at said non-conducting portion.

8. In an integral lampholder and switch assembly as in claim 7, said second contact comprising a leaf spring element, and said switch means including a cam engaging said leaf spring element.

9. In an integral lampholder and switch assembly as in claim 8, said leaf spring element including a delineation engaged by said cam whereby said cam moves over and past said delineation as said switch means moves from said non-conducting to said conducting positions in an over-center retaining relationship.

10. In an integral lampholder and switch assembly as in claim 5, said mounting means comprising a pair of spaced, substantially parallel, cantilever fingers extending from said housing each having a free end, and an abutment surface defined on each finger free end.

* * * * *